(12) United States Patent
Passi et al.

(10) Patent No.: US 6,545,681 B2
(45) Date of Patent: Apr. 8, 2003

(54) METHOD OF DISPLAYING A STREAM OF DIGITAL DATA ON DISPLAY AREA OF A PREDETERMINED SIZE

(75) Inventors: Alex Passi, Ashdod (IL); Garri Passi, Ashdod (IL); Alon Eitan, Tel Aviv (IL)

(73) Assignee: Medson Ltd., Rehovot (IL)

( * ) Notice: Subject to any disclaimer, the term of this patent is extended or adjusted under 35 U.S.C. 154(b) by 24 days.

(21) Appl. No.: 09/793,980

(22) Filed: Feb. 28, 2001

(65) Prior Publication Data

US 2002/0118191 A1 Aug. 29, 2002

(51) Int. Cl.$^7$ ................................................ G09G 5/00
(52) U.S. Cl. ........................................ 345/440; 702/66
(58) Field of Search ........................ 345/440, 440.1, 345/440.2, 660, 670, 671; 324/121 R; 702/66, 67, 68, 69

(56) References Cited

U.S. PATENT DOCUMENTS

| | | | |
|---|---|---|---|
| 5,003,248 A | * | 3/1991 | Johnson .................. 345/440.1 |
| 5,335,295 A | | 8/1994 | Ferracini et al. |
| 5,555,180 A | | 9/1996 | Hilger et al. |
| 5,684,507 A | | 11/1997 | Rasnake et al. |
| 5,684,508 A | | 11/1997 | Brilman |
| 5,784,284 A | | 7/1998 | Taraki |
| 5,837,899 A | | 11/1998 | Dickerman et al. |
| 6,016,700 A | | 1/2000 | Cuffe |

* cited by examiner

Primary Examiner—Xiao Wu
(74) Attorney, Agent, or Firm—Mark M. Friedman

(57) ABSTRACT

Disclosed are methods of graphically displaying digital data containing a predetermined number of digital values, on a display area containing a lower, predetermined number of graphical display elements. One disclosed method includes the steps of attributing to each display element a portion of the digital values, the total number of digital values in all portions being equal the total number of digital values so that variability among the portions is periodic and calculating a representative digital value for each portion and displaying the representative value on a discrete display element in the display. Also disclosed is a method of determining for each graphical display element in an apparatus with a lesser number of graphical display elements a corresponding number of digital values to represent, the digital values being selected from a stream containing a greater number of digital values. The method includes the steps of dividing the greater number by the lesser number to ascertain a quotient and determining for each graphical display element a corresponding number of digital values to represent, based on the quotient. According to this method, the apparatus uses a known method of representing a plurality of digital values using a single graphical display element.

19 Claims, 11 Drawing Sheets

$$M = 199$$
$$N = 10$$
$$q = \frac{M}{N} = \frac{199}{10} = 19.9$$
$$K = Integer\,[q] = [19.9] = 19$$

| i | x[i] | z |
|---|---|---|
| 1 | 19 | 19 |
| 2 | 20 | 39 |
| 3 | 20 | 59 |
| 4 | 20 | 79 |
| 5 | 20 | 99 |
| 6 | 20 | 119 |
| 7 | 20 | 139 |
| 8 | 20 | 159 |
| 9 | 20 | 179 |
| 10 | 20 | 199 |

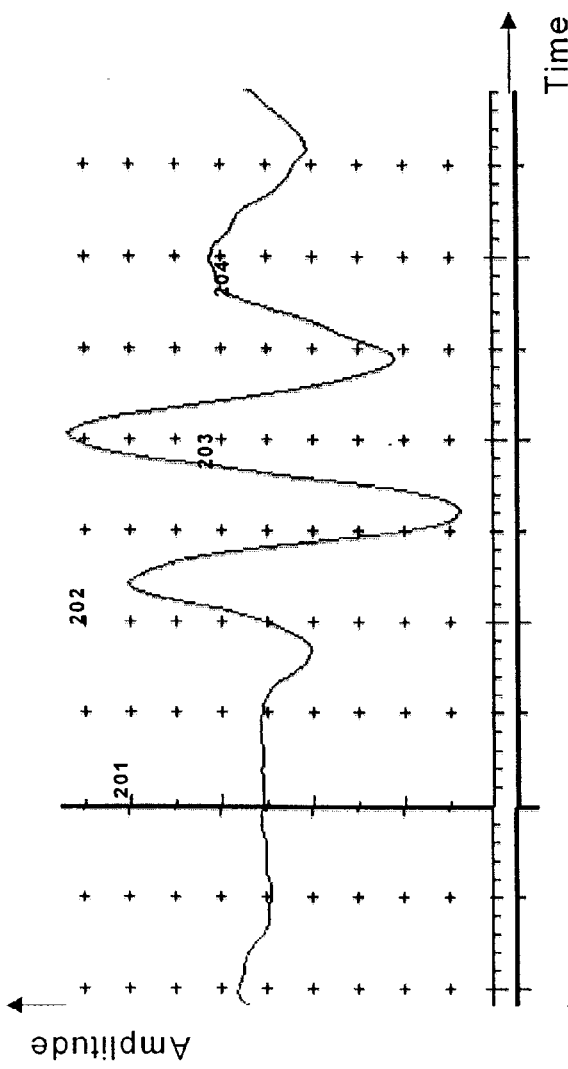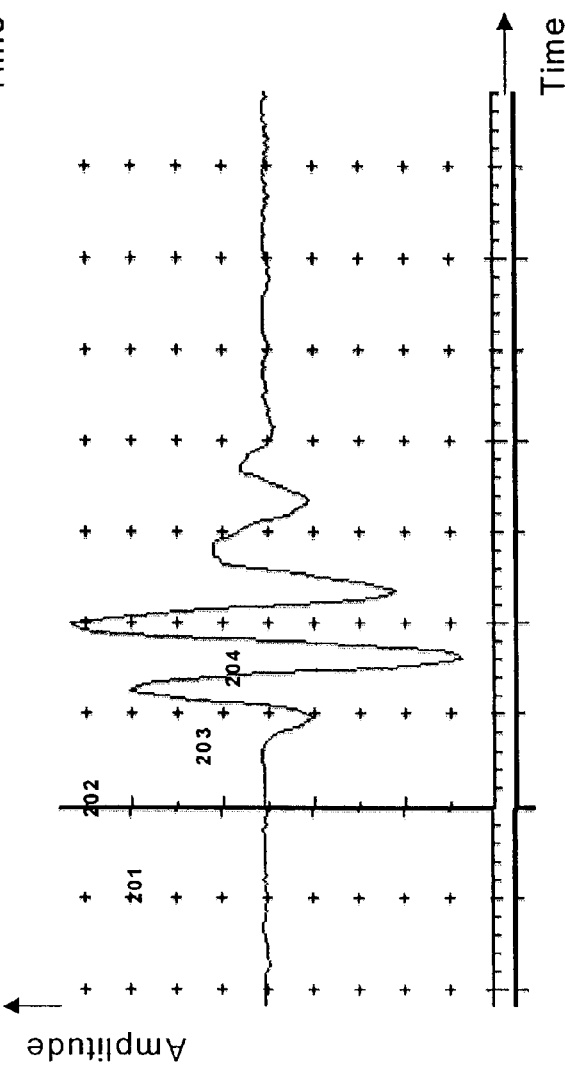

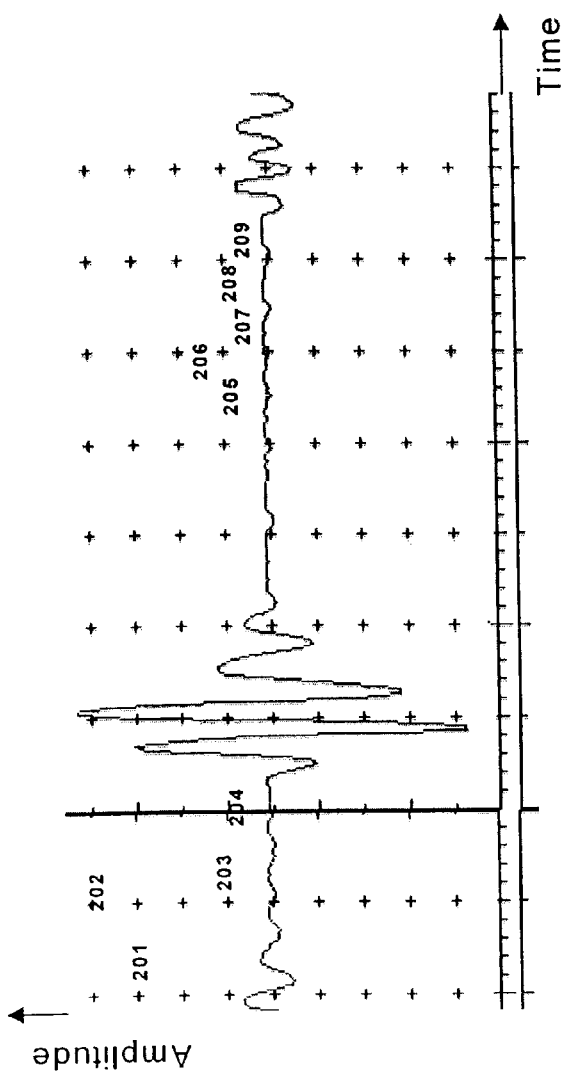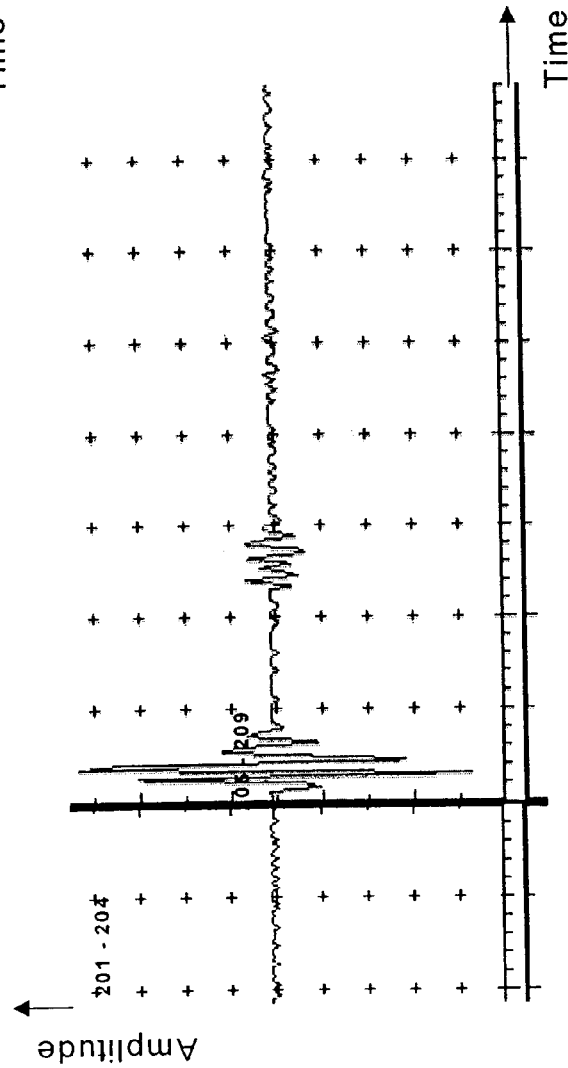

$M = 200$ $N = 10$ $q = \dfrac{M}{N} = \dfrac{200}{10} = 20$ $K = Integer\ [q] = [20] = 20$

| i | x[i] | z |
|---|------|-----|
| 1 | 20 | 20 |
| 2 | 20 | 40 |
| 3 | 20 | 60 |
| 4 | 20 | 80 |
| 5 | 20 | 100 |
| 6 | 20 | 120 |
| 7 | 20 | 140 |
| 8 | 20 | 160 |
| 9 | 20 | 180 |
| 10 | 20 | 200 |

$M = 199$ $N = 10$ $q = \dfrac{M}{N} = \dfrac{199}{10} = 19.9$ $K = Integer\ [q] = [19.9] = 19$

| i | x[i] | z |
|---|------|-----|
| 1 | 19 | 19 |
| 2 | 20 | 39 |
| 3 | 20 | 59 |
| 4 | 20 | 79 |
| 5 | 20 | 99 |
| 6 | 20 | 119 |
| 7 | 20 | 139 |
| 8 | 20 | 159 |
| 9 | 20 | 179 |
| 10 | 20 | 199 |

$M = 198$ $N = 10$ $q = \dfrac{M}{N} = \dfrac{198}{10} = 19.8$ $K = Integer\ [q] = [19.8] = 19$

| i | x[i] | z |
|---|------|-----|
| 1 | 19 | 19 |
| 2 | 20 | 39 |
| 3 | 20 | 59 |
| 4 | 20 | 79 |
| 5 | 20 | 99 |
| 6 | 19 | 118 |
| 7 | 20 | 138 |
| 8 | 20 | 158 |
| 9 | 20 | 178 |
| 10 | 20 | 198 |

$M = 197$ $N = 10$ $q = \dfrac{M}{N} = \dfrac{197}{10} = 19.7$ $K = Integer\ [q] = [19.7] = 19$

| i | x[i] | z |
|---|------|-----|
| 1 | 19 | 19 |
| 2 | 20 | 39 |
| 3 | 20 | 59 |
| 4 | 19 | 78 |
| 5 | 20 | 88 |
| 6 | 20 | 108 |
| 7 | 19 | 127 |
| 8 | 20 | 147 |
| 9 | 20 | 167 |
| 10 | 20 | 187 |

$M = 196$ $N = 10$ $q = \dfrac{M}{N} = \dfrac{196}{10} = 19.6$ $K = Integer\ [q] = [19.6] = 19$

| i | x[i] | z |
|---|------|-----|
| 1 | 19 | 19 |
| 2 | 20 | 39 |
| 3 | 19 | 58 |
| 4 | 20 | 78 |
| 5 | 20 | 98 |
| 6 | 19 | 117 |
| 7 | 20 | 137 |
| 8 | 19 | 156 |
| 9 | 20 | 176 |
| 10 | 20 | 196 |

$M = 195$ $N = 10$ $q = \dfrac{M}{N} = \dfrac{195}{10} = 19.5$ $K = Integer\ [q] = [19.5] = 19$

| i | x[i] | z |
|---|------|-----|
| 1 | 19 | 19 |
| 2 | 20 | 39 |
| 3 | 19 | 58 |
| 4 | 20 | 78 |
| 5 | 19 | 97 |
| 6 | 20 | 117 |
| 7 | 19 | 136 |
| 8 | 20 | 156 |
| 9 | 19 | 175 |
| 10 | 20 | 195 |

$M = 194$ $N = 10$ $q = \dfrac{M}{N} = \dfrac{194}{10} = 19.4$ $K = Integer\ [q] = [19.4] = 19$

| i | x[i] | z |
|---|------|-----|
| 1 | 19 | 19 |
| 2 | 19 | 38 |
| 3 | 20 | 58 |
| 4 | 19 | 77 |
| 5 | 20 | 97 |
| 6 | 19 | 116 |
| 7 | 19 | 135 |
| 8 | 20 | 155 |
| 9 | 19 | 174 |
| 10 | 20 | 194 |

$M = 193$ $N = 10$ $q = \dfrac{M}{N} = \dfrac{193}{10} = 19.3$ $K = Integer\ [q] = [19.3] = 19$

| i | x[i] | z |
|---|------|-----|
| 1 | 19 | 19 |
| 2 | 19 | 38 |
| 3 | 19 | 57 |
| 4 | 20 | 77 |
| 5 | 19 | 96 |
| 6 | 19 | 115 |
| 7 | 20 | 135 |
| 8 | 19 | 154 |
| 9 | 19 | 173 |
| 10 | 20 | 193 |

$M = 192$ $N = 10$ $q = \dfrac{M}{N} = \dfrac{192}{10} = 19.2$ $K = Integer\ [q] = [19.2] = 19$

| i | x[i] | z |
|---|------|-----|
| 1 | 19 | 19 |
| 2 | 19 | 38 |
| 3 | 19 | 57 |
| 4 | 19 | 76 |
| 5 | 20 | 96 |
| 6 | 19 | 115 |
| 7 | 19 | 134 |
| 8 | 19 | 153 |
| 9 | 19 | 172 |
| 10 | 20 | 192 |

$M = 191$ $N = 10$ $q = \dfrac{M}{N} = \dfrac{191}{10} = 19.1$ $K = Integer\ [q] = [19.1] = 19$

| i | x[i] | z |
|---|------|-----|
| 1 | 19 | 19 |
| 2 | 19 | 38 |
| 3 | 19 | 57 |
| 4 | 19 | 76 |
| 5 | 19 | 95 |
| 6 | 19 | 114 |
| 7 | 19 | 133 |
| 8 | 19 | 152 |
| 9 | 19 | 171 |
| 10 | 20 | 191 |

METHOD OF DISPLAYING A STREAM OF DIGITAL DATA ON DISPLAY AREA OF A PREDETERMINED SIZE

FIELD AND BACKGROUND OF THE INVENTION

The present invention relates to methods of graphically displaying digital data and, more particularly, to a method of representing a continuous stream containing a predetermined number of digital values, on a display area containing a lower, predetermined number of graphical display elements.

Graphical display of a stream of digital data has numerous practical uses in various diagnostic and analytic applications. One such useful application is, for example, the graphical display of digital samples representing a digitized electrical signal. In some cases, the display of a digitized signal will be used to examine the performance of the instrument which generated the electrical signal, for example, to evaluate the stability of an electrical generator. In other cases, an electrical signal may be generated as an analog electrical imitation of other natural phenomena, such as acoustic oscillation, temperature, pressure, acceleration, or physical position, among others. In the latter cases, display of the electrical signal will be used as a tool for observing and examining the behavior of the physical phenomenon represented by the electrical signal.

Present day techniques of displaying a digitized electrical signal, for example, using a Digital Storage Oscilloscope ("DSO"), typically include: converting an electrical signal of interest into a stream of digital samples or "readings" using an analog to digital converter ("ADC"); sending the digital stream to a digital computing device, for example, a computer or a microprocessor; processing the digital data with the digital computing device, in order to prepare the digital data for display; and displaying the processed data on a graphical display device, for example, a cathode-ray tube ("CRT"), a dot-matrix liquid crystal display ("LCD") or any other type of display known in the art.

A contemporary DSO typically includes an ADC capable of sampling electrical signals at sampling rates of as high as millions (MHz) or even billions (GHz) of readings per second. The increase in sampling rate capabilities is highly advantageous, since a greater sampling rate means greater accuracy in the digital representation of a sampled signal. As opposed to high sampling rates of existing ADCs, present day display devices are still confined to much lower resolutions of display. A standard display device, such as a personal computer monitor, will usually accommodate a maximum number of graphical display elements, namely "pixels", on the order of only a few hundreds by a few hundreds (e.g. 800 by 600 pixels, 1024 by 768 pixels, etc.).

Thus, it is common practice in present day techniques for displaying digitized signals, that the number of digital readings produced by an ADC exceeds by far the number of pixels available for displaying the same. In order to display a high number of digital readings on a display which is able to accommodate a much lower number of pixels, every pixel must represent more than one digital reading at a given time. Several known methods attempt to cope with the problem of displaying a high number of digital readings on a display including a lower number of pixels.

U.S. Pat. No. 5,684,507 to Rasnake et al. discloses a method of displaying continuously acquired data on a fixed length display. According to teachings of this patent an ADC receives an input electrical signal and produces a continuous stream of "measurement data" (i.e. digital readings). The stream is continuously sent to a digital computing device. The digital computing device continuously converts incoming readings into pixel information in such a manner that every pixel plotted on the display represents a predetermined number of readings. Pixel information is continuously plotted on the display area, for example, from the leftmost pixel column to the rightmost pixel column. As the last available pixel (e.g. the rightmost pixel) on the display is reached, all the pixel information currently displayed on the display area, is then compressed into a fraction of the display area (e.g. into the left half of the display area), thus continuously providing room for newly arriving pixel information to be plotted on the remaining fraction of the display area.

These teachings include several inherent disadvantages. First, the teachings of Rasnake result in a disproportional, non-linear distribution of readings per pixel throughout the display area. Each time data is compressed into a fraction of the display area, compressed data will appear on a smaller scale than newly plotted data. For example, let us consider an example in which the compression ratio is 2 to 1, meaning that the total display area is repeatedly compressed into a half of the display area (for example, the left half). In such a case, after the first compression operation is completed, the compressed pixel information will appear on the left half of the display area on a scale of 2 to 1. In other words, every pixel column on the left half of the display area will represent pixel information which, prior to the compression, was represented by two pixels. The problem is that, according to the Rasnake method, newly arriving pixel information will still be plotted on the display area on a scale of 1 to 1. Consequently, data displayed on the compressed fraction (i.e. the left half of the display area) will appear on a scale of 2 to 1, whilst at the same time data displayed on the remaining fraction (i.e. the right half of the display data) will appear on a scale of 1 to 1. This problem is inherent to the Rasnake method, and therefore will persist regardless of which compression ratio is chosen and regardless of how many compressions were made (provided that at least one compression was made).

Second, the teachings of Rasnake do not guarantee that when the plotting process is ended, all available pixels on the display area will be utilized. According to these teachings, newly arriving pixel information is plotted on the display area until no more pixels on the display are available, at which point the displayed data is compressed into a fraction of the display area. However, if the process is halted exactly after a compression was made, then the remaining portion of the display area (i.e. the total display area excluding the fraction into which data was compressed) will remain empty and unused. Similarly, if the plotting process is ended after some pixel information was already plotted on the display, but before the last available pixel is reached, then again some pixel columns on the display area will remain unused. Only if the process is stopped exactly when the last available pixel is plotted (a statistically rare case indeed), will the complete display area be utilized. Even if such a rare case occurs, there will still be the problem of disproportionality between the compressed fraction and the remaining portion of the display area, as explained heretofore. Therefore these teachings are unsuitable for displaying a batch of digital data, that is, displaying a stream of digital data in cases where the number of digital values contained in the stream is known in advance.

Third, the teachings of Rasnake do not enable the user to choose, in advance, a desired ratio of readings per pixel.

Instead, pixel information representing digital readings is repeatedly compressed, so that the number of readings represented by a single pixel in the compressed fraction of the display increases with every compression. As a result, after a certain number of compressions, any further compression will assign too many readings per one pixel, to the extent that such a display of the readings will no longer be meaningful or useful for the user. According to the method, the user has no ability to determine, in advance, a target ratio of readings per pixel, after which no further compressions will be made.

Fourth, the teachings of Rasnake require dedicated hardware, namely a special microprocessor, containing special firmware. Such a solution is expensive, inflexible and difficult to achieve. Implementation of the teachings of Rasnake with software only is presently infeasible.

U.S. Pat. No. 5,684,508 to Brilman teaches a method which partially solves some of the deficiencies of the Rasnake method. According to the Brilman method, upon reaching the last available pixel, the displayed pixel information is compressed to half the fixed number of available pixels, and in addition, the pixel rate is halved, thereby doubling the time scale of the display. As a predetermined minimum pixel rate is eventually reached, rather than performing another compression, the displayed pixel information begins to scroll in a "roll mode". In roll mode, the newest pixel information is plotted on the rightmost pixel column of the display area and the information contained in the other pixel columns is shifted to the left by one pixel column. The oldest pixel information, which is plotted on the leftmost pixel column of the display area, is discarded. This scrolling process can continue indefinitely.

Although in roll mode all available pixels on the display are utilized at any given moment, the teachings of Brilman offer only a partial solution to the problems described above because, during the initial stage at which pixels are plotted and compressed alternatively, not all pixels will be utilized at any given moment.

The teachings of Brilman still suffer from inherent limitations. First, Brilman also teaches displaying a stream of digital data containing an indefinite number of readings. Display of a predefined number of readings is not taught by Brilman. Further, Brilman also teaches the use of a dedicated microprocessor. Thus, the method taught by Brilman cannot be implemented using a software only solution. The following is a cross-reference list of related prior art patents:

- U.S. Pat. No. 5,335,295 to Ferracini et al. teaches a two step method for first enlarging a digital image and then shrinking by a factor which is a power of 2. These teachings are inherently slow when implemented on a data processor.
- U.S. Pat. No. 5,555,180 to Hilger et al. deals with storage and subsequent reconstruction of ultrasonic waveforms. Teachings of this patent do not specifically relate to scaling.
- U.S. Pat. No. 5,784,284 to Taraki teaches a method in which some data points are discarded so that a number of data points equal in number to the number of pixels is achieved.
- U.S. Pat. No. 5,837,899 to Dickerman et al. teaches a hardware gate, a limitation similar to that imposed by Brilman and Rasnake.
- U.S. Pat. No. 6,016,700 to Cuffe teaches a method for ultrasonic analysis of an object which includes signal conversion but does not specifically address the issue of correspondence between number of data points and number of pixels.

There is thus a widely recognized need for, and it would be highly advantageous to have a method of displaying a stream of digital data containing a predetermined number of digital values, on a display area consisting of a lower predetermined number of graphical display elements devoid of the above limitations.

SUMMARY OF THE INVENTION

According to one aspect of the present invention there is provided a method of displaying a stream of data containing a first number of digital values on display area of a predetermined size containing a second number of display elements. The method is most useful when the second number is less than the first number and includes the steps of: (a) attributing to each display element a portion of the first number of digital values so that the total number of digital values in all of the portions equals the first number, and the number of digital values in each portion varies periodically (b) determining at least one representative digital value for each of the portions, and (c) displaying on each discrete display element in the display the representative digital value.

According to another aspect of the present invention there is provided a method of determining for each graphical display element in an apparatus with a lesser number of graphical display elements a corresponding number of digital values to represent. The digital values are selected from a stream containing a greater number of digital values than the number of display elements. The method includes the steps of (a) dividing the greater number by the lesser number to ascertain a quotient and (b) determining for each graphical display element a corresponding number of digital values to represent based on the quotient. Preferably, the apparatus uses a known method of representing a plurality of digital values using a single graphical display element.

According to further features in preferred embodiments of the invention described below, the number of digital values in each portion varies with a fixed periodicity.

According to still further features in the described preferred embodiments the number of digital values in each portion is characterized by minimum variability.

According to still further features in the described preferred embodiments the stream of digital values is a stream of digital samples.

According to still further features in the described preferred embodiments the stream of digital samples represents a digitized electrical signal.

According to still further features in the described preferred embodiments the digitized electrical signal represents an ultrasonic signal.

According to still further features in the described preferred embodiments the step of determining includes using an algorithm.

According to still further features in the described preferred embodiments the algorithm is selected from the group consisting of determining a maximum value, determining a minimum value, computing a mean, computing a mode, computing a median, computing a weighted average, a randomly selected value and selecting a digital value received at a time approximating a mid-point of a time during which said portion is received.

According to still further features in the described preferred embodiments the number of digital values in each of the portions is selected from a group consisting of: (i) the quotient of dividing the first number by the second number;

(ii) the lowest whole number greater than the quotient; and
(iii) the greatest whole number less than the quotient.

According to still further features in the described preferred embodiments the display elements are selected from the group consisting of pixel rows and pixel columns.

According to still further features in the described preferred embodiments the apparatus is selected from the group consisting of a Digital Storage Oscilloscope (DSO) and an ultrasonic flaw detection device.

According to still further features in the described preferred embodiments the stream containing a first number of digital values is displayed as a frequency spectrum.

According to still further features in the described preferred embodiments the determining of a corresponding number based on the quotient maintains a periodic distribution of the determined corresponding numbers.

According to still further features in the described preferred embodiments the determining of a corresponding number based on the quotient maintains minimal variability between the corresponding numbers.

According to still further features in the described preferred embodiments the determining of a corresponding number based on the quotient, includes selecting a number from a group consisting of the quotient of dividing the first (greater) number by the second (lesser) number, the greatest whole number less than the quotient and the lowest whole number greater than the quotient.

The present invention successfully addresses the shortcomings of the presently known configurations by providing a method of graphically displaying a continuous stream containing a predetermined number of digital values, on a display area containing a lower, predetermined number of graphical display elements.

BRIEF DESCRIPTION OF THE DRAWINGS

The invention is herein described, by way of example only, with reference to the accompanying drawings. With specific reference now to the drawings in detail, it is stressed that the particulars shown are by way of example, and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIGS. 5a–5d are examples of screenshots of a display of a digitized signal, the signal having been processed using a method according to the present invention.

DESCRIPTION OF THE PREFERRED EMBODIMENTS

The present invention is of a method of graphically displaying digital data. The method is useful for representing a continuous stream containing a predetermined number of digital values on a display area containing a lower, predetermined number, of graphical display elements. The display elements may be, for example, pixel rows or pixel columns.

According to the method of the present invention, a first stream containing a predetermined number of source values is transformed into a second stream containing a lower predetermined number of representative values in order to enable display on a display device. Specifically, the present invention can be used to insure representation of all portions of the stream at similar resolution while insuring use of the available display area.

Figure 3:
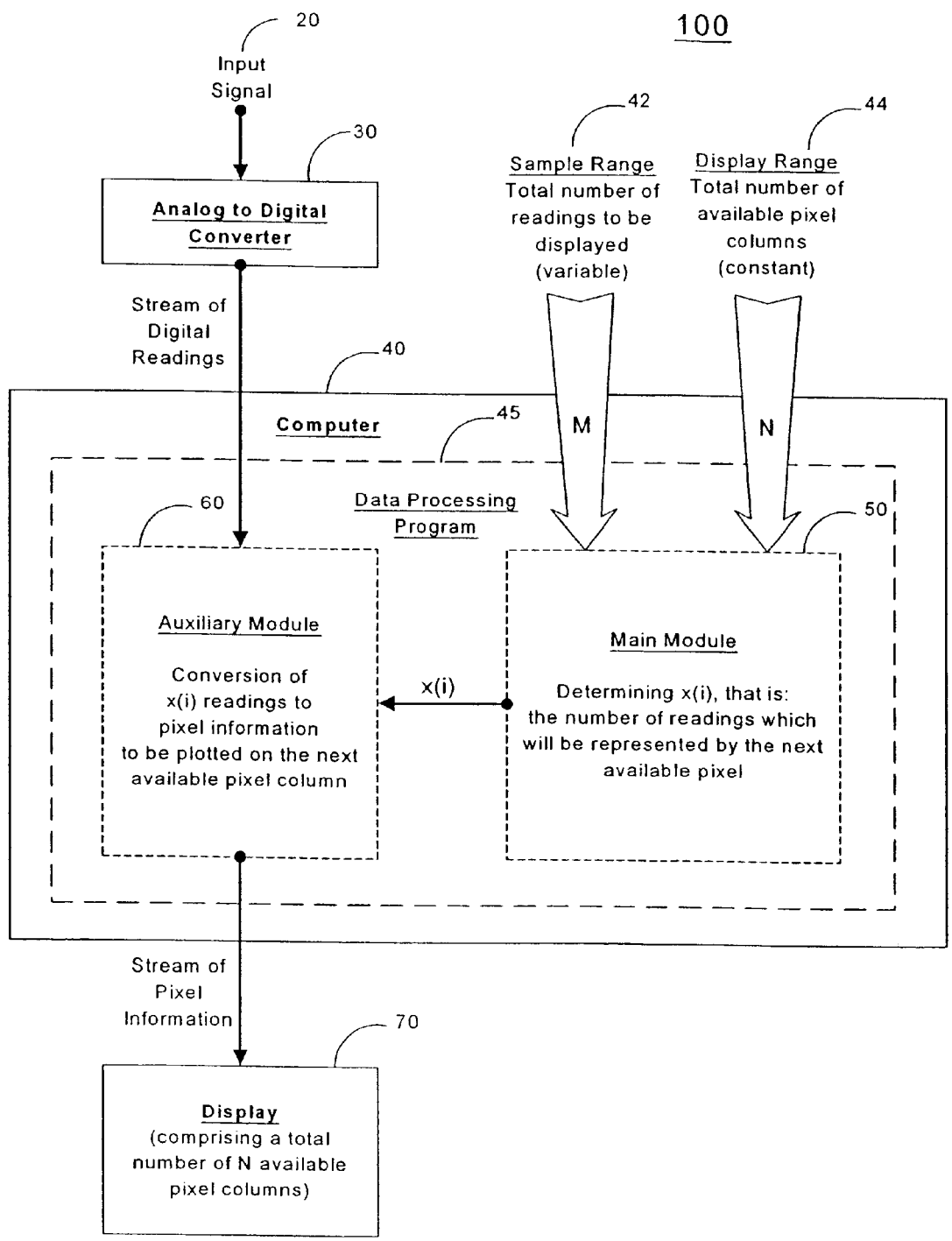
Figure 4:
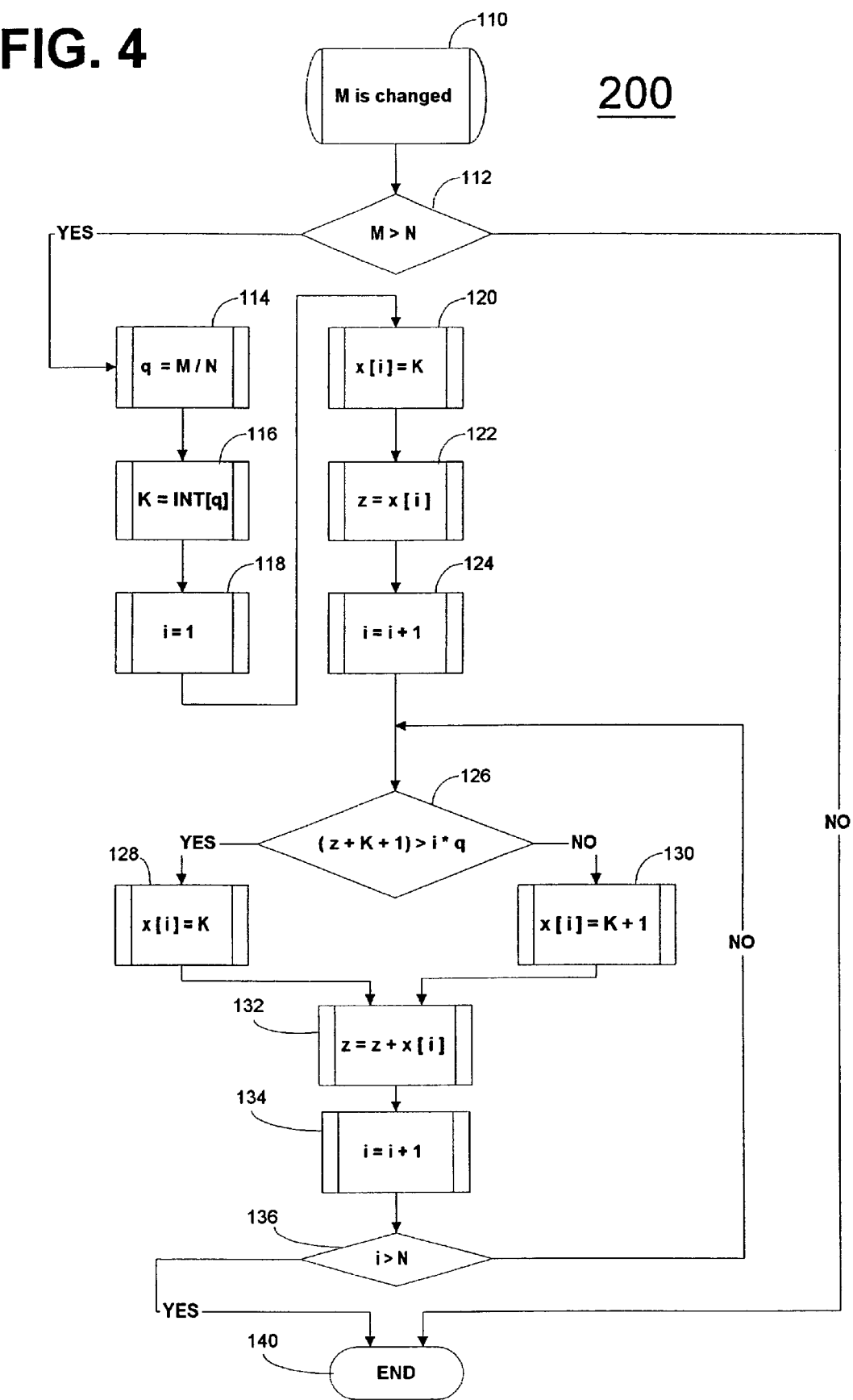
FIG. 4 is a flowchart illustrating a preferred algorithm according to the method of the present invention.

Referring now to FIG. 4, the present invention is of a method 200 of displaying a stream of data containing a first number (M) 110 of digital values on a predetermined area of display 70 (FIGS. 1, 2 and 3) containing a second number (N) of display elements. The stream of digital values may be, for example, a stream of digital samples. In some cases, the stream of digital samples may represent a digitized electrical signal, for example an electronic signal representing an ultrasonic signal. This conversion from ultrasonic to electrical signal may be accomplished, for example, by means of a transducer. The method is most useful when N is less than M 112 and includes the step of attributing to each display element a portion K 128 or (K+1) 130 of first number M 110 of digital values so that the total number of digital values in all of the portions equals first number 110, and the number of digital values in each portion varies periodically. Preferably, method 200 achieves minimum variability between the different portions in terms of the number of digital values attributed to each portion and, alternately or additionally, provides a fixed periodicity for the variation. The number of digital values in each of the portions may be, for example the quotient q of dividing M by N or the lowest whole number greater than quotient q or the greatest whole number less than quotient q.

Method 200 further includes the step of determining at least one representative digital value for each of the portions. The representative digital value may be determined, for example, by means of an algorithm. Such an algorithm may include, for example, determining a maximum value, determining a minimum value, computing a mean, computing a mode, computing a median, computing a weighted average, randomly selecting a value, or selecting a digital value received at a time approximating a mid-point of a time during which the portion is received.

Method 200 further includes the step of displaying on each discrete display element in the designated display area 70 the representative digital value.

According to another aspect of the present invention there is provided a method 200 of determining for each graphical display element in an apparatus 100 (FIGS. 1, 2 and 3) with a lesser number (N) of graphical display elements a corresponding number of digital values to represent. The digital values are selected from a stream containing a greater number (M) of digital values than the number of display elements N. Method 200 includes the step of dividing 114 the greater number by the lesser number to ascertain a quotient (q) equal to M/N.

Method 200 further includes the step of determining for each graphical display element a corresponding number K 128 or (K+1) 130 of digital values to represent, based on quotient q. Preferably, apparatus 100 uses a known method of representing a plurality of digital values using a single graphical display element. Preferably the determining of a corresponding number based on the quotient varies periodically. More preferably, the variability is characterized by a fixed periodicity as well as minimum variability between the determined corresponding numbers. The determining of a corresponding number based on quotient q may include, but is not limited to, selecting a number from a group consisting of quotient q, the greatest whole number less than quotient q or the lowest whole number greater than the quotient.

Apparatus 100 may include, but is not limited to a Digital Storage Oscilloscope (DSO) or an ultrasonic flaw detection device. In some cases apparatus 100 displays the stream containing a first number M of digital values on the predetermined area of display 70, as a frequency spectrum.

Figure 1:
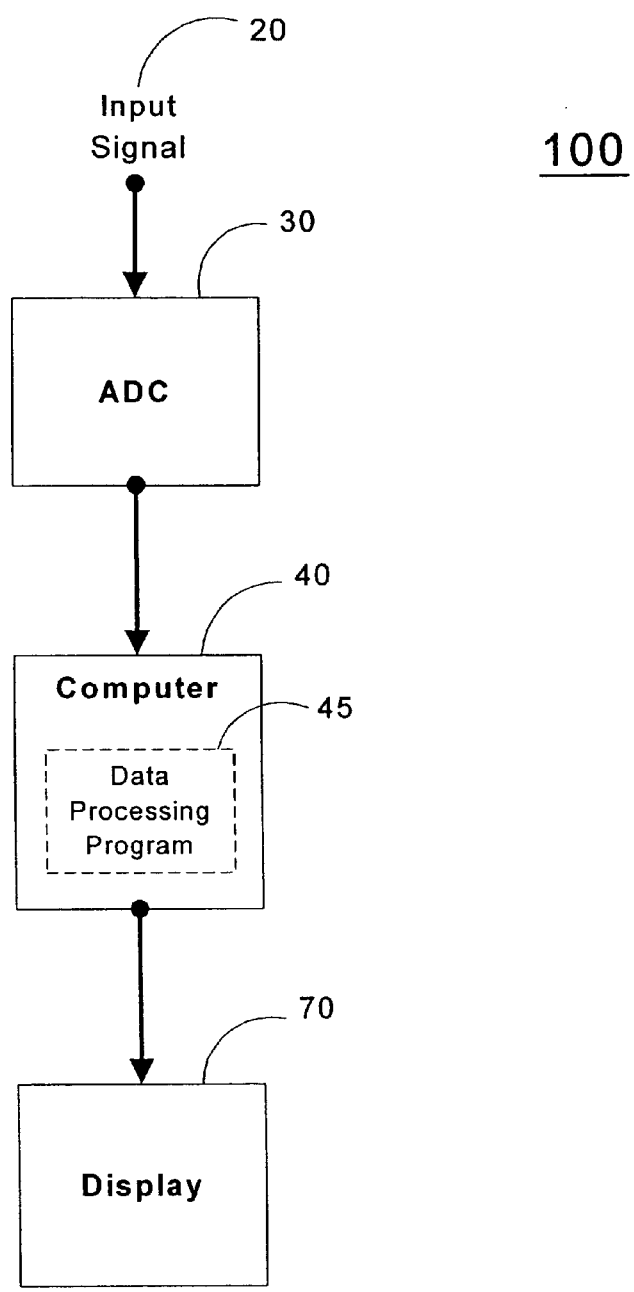
FIGS. 1–3 are functional block diagrams illustrating, in different levels of detail, an environment in which the method of the present invention may be implemented.
Figure 2:
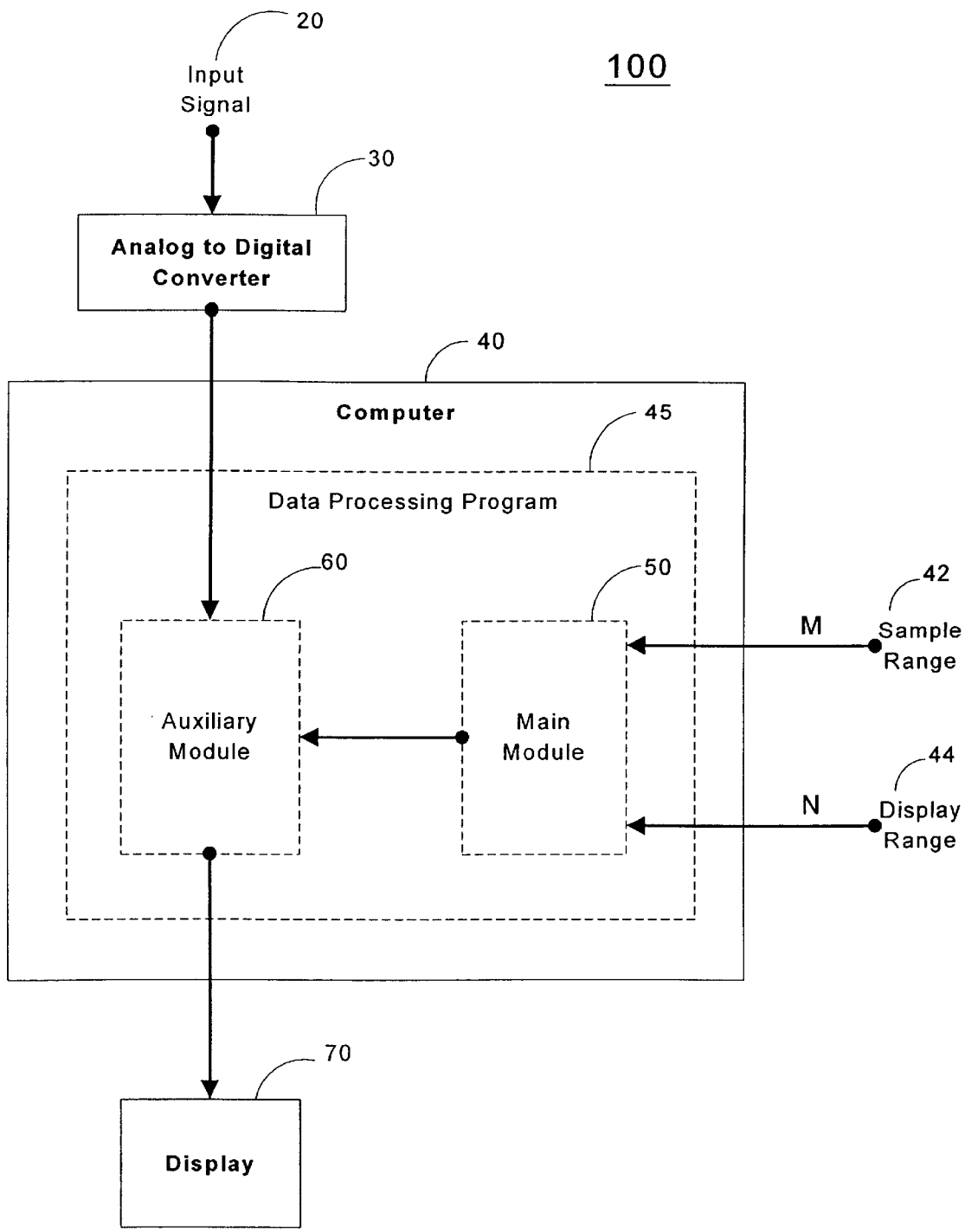

According to preferred embodiments of the present invention, method 200 is performed on a computer. FIGS. 1–3 and description hereinbelow are intended to provide a non-limiting description of a computer system in which the method of the present invention may be implemented. It is stressed that one of the advantages of method 200 is that it may be accomplished using a wide variety of commercially available computer hardware. Therefore, method 200 is inherently more flexible than prior art alternatives which require specialized hardware for implementation. In addition, method 200 will be easily adapted to a wide range of applications using different inputs and display devices.

Referring now to FIG. 1, there is shown a high level functional block diagram of an apparatus 100 in which method 200 of the present invention may be implemented. Apparatus 100 is an apparatus for acquiring, digitizing, processing and displaying an electrical signal. Apparatus 100 includes an analog-to-digital converter ("ADC") 30, a computer 40 and a display 70. ADC 30 includes an input port, which receives an electrical input signal 20. ADC 30 is coupled to computer 40, which is coupled to display 70.

ADC 30 is a known analog-to-digital converter device, for example microchip HI3026 of Intersil Corporation of Palm Bay, Fla. Computer 40 may be any computer known in the art, for example, a general purpose IBM-compatible personal computer. Display 70 is any known graphical display device, for example, a cathode-ray tube (CRT) or a dot-matrix liquid crystal display (LCD). One ordinarily skilled in the art will be capable of assembling a wide range of commercially available components for use in conjunction with the present invention without substantially altering the invention.

During operation of Apparatus 100 ADC 30 receives an electrical input signal 20, which may be the output of any source capable of generating an electrical signal. For example, input signal 20 may be the output of an electrical generator generating a direct or alternating current. Alternatively, input signal 20 may be the output of a sensor which converts other natural phenomena (for example, acoustic oscillations, temperature, pressure, acceleration, or physical position, among others) to an analog electrical output. For example, in apparatus 100, input signal 20 is the output of a transducer which converts ultrasonic signals into analog electrical signals.

ADC 30 receives input signal 20 and converts it into a continuous array or stream of digital values, by repeatedly measuring a predetermined characteristic of the signal (e.g. the amplitude of the signal) at predetermined time intervals. Each discrete digital value, also named "sample" or "reading", represents the value of a discrete measurement. The sampling rate, or the rate at which ADC 30 samples signal 20, is controlled by the user of system 100. Let us consider, for example, that ADC 30 samples input signal 20 at a sampling rate of 100 MHz, that is 100 million readings per second, or 100 readings per microsecond. ADC 30 sends to computer 40 a continuous stream of digital readings, representing input signal 20.

Computer 40 receives a continuous stream of digital readings from ADC 30, and executes a digital data processing program 45, which continuously converts the readings to display instructions, or "pixel information". Such a conversion of the sample data (i.e. digital readings) to display data (i.e. pixel information) is necessary, because the number of readings to be displayed will often exceed the number of pixels available for displaying the same. As described hereinbelow, the method of the present invention is embodied in one of the modules of program 45.

The computer continuously sends a stream of pixel information to display 70, which plots the information in a predetermined display area on the screen, thereby providing a display of digitized input signal 20. Examples of display outputs are provided in FIGS. 5 a–d which are described hereinbelow.

Turning now to FIG. 2, there is shown a more detailed functional block diagram of apparatus 100, including a high level illustration of data processing program 45 executed by computer 40. As explained hereinabove, computer 40 receives a stream of digital readings from ADC 30 and executes data processing program 45, which converts the readings to display instructions, or display values (i.e. pixel information).

The goal of program 45 is to represent a predetermined number of digital readings, using a predetermined number of pixel values corresponding to a predetermined number of pixels available on a designated display area of display 70. The display area may be, for example a window as commonly encountered in Windows, Macintosh and Linux operating systems. Program 45 achieves its goal by operating at least two modules: main module 50 and auxiliary module 60. In general, the purpose of main module 50 is to determine, for each available pixel, the number of readings which will be represented by that pixel, so that a periodic distribution of readings per pixel will be achieved along the display area. Preferably, this is accomplished while maintaining minimal variability in terms of the number of readings assigned to different pixels. The purpose of auxiliary module 60 is to deduce from the readings attributed (by module 50) to each pixel, a representative value which will be displayed in that pixel. Main module 50 is based on method 200 of the present invention, as will be described in detail hereunder. Auxiliary module 60, on the other hand, is based on methods previously known in the art for deducing a representative value as detailed hereinabove from a given series of digital values.

Following is a description of the inputs to main module 50. The main module receives as inputs, a Source Range M and a Target Range N. Source range M is a digital value representing the total number of digital readings, which are to be displayed on the display area of display 70. The value of source range M is variable, and it is fed into computer 40 via a first controller 42, by the user of apparatus 100. The user may change the source range according to their needs at any given moment. A greater source range means more readings to display, which will consequently result in a less detailed picture of the digital data (e.g. the digitized signal) over a greater scale (e.g. a longer time scale). A lower source range means less readings to display, consequently achieving a more detailed picture of the digital data (e.g. the digitized signal) over a smaller scale (e.g. a shorter time scale). Method 200 of the present invention allows the user to change source range M at any given moment, both before and during the execution of data processing program 45, without disturbing the operation of the program, and without being required to re-initiate the program.

Target range N represents the number of graphical display elements, for example pixels, available for display. For example, in an application where digital data are displayed over a horizontal axis (most common), N represents the number of pixel columns. As an additional example, in an application where digital data are displayed over a vertical axis (less common), N will represent the number of pixel rows. In the current example, apparatus 100 is designed to display a digitized electrical signal over a horizontal time axis, and therefore N represents the number of pixel columns.

Target range N has a predetermined constant value per application or per execution of program 45. It will be appreciated that a user of apparatus 100 may be able to input N, for example by adjusting a size of a display window or by altering the pixel resolution of display 70. The value of target range N is fed into computer 40 via a second controller 44, prior to initiating data processing program 45. The value of N may vary from one application to another depending on several factors, such as the resolution of display, the video standard and video chip used by the computer, and the size of the display area dedicated for displaying the signal (e.g. the total screen area, excluding such portions which are dedicated for displaying a user interface or for displaying other applications), among other factors. For purposes of the present example, it is assumed that display 70 of apparatus 100 supports a maximum number of 800 by 600 pixels, out of which 400 by 300 pixels are dedicated as the predetermined display area for displaying input signal 20. Accordingly, in the current example, target range N will equal 400, because there is a total of 400 pixel columns available for displaying input signal 20.

It should be noted, that data processing program 45 could be enhanced to receive a wide variety of inputs, in addition to source range M and target range N. Additional inputs might include, but are not limited to a starting point (i.e. the serial number of a reading from which the source range should be counted) or a decimation factor (i.e. a factor used for discarding X readings out of every Y consecutive readings) or other algorithmically defined operations.

FIG. 3 shows a low level functional block diagram illustrating apparatus 100 and, in particular, the interaction between main module 50 and auxiliary module 60 in data processing program 45.

As described hereinabove main module 50 receives as an input, the values of source range M and target range N. Upon receiving the value of M for the first time, or upon any change in the value of M, main module 50 starts a data processing procedure, which is an integral part of method 200 of the present invention. Hereinbelow is a brief description of a preferred data processing algorithm of main module 50 (see also FIG. 4).

The algorithm of main module 50 of program 45, which embodies method 200, is designed to determine the number of readings which will be represented in each available display element (e.g. pixel column). As recited hereinabove, the same algorithm can be used to determine the number of readings to be represented in each pixel row when required.

The number of readings per pixel column is denoted herein as x(i), wherein "i" is the serial number of the pixel column (i=1 ... N) and "x" is the number of readings to be displayed in that specific pixel column. The algorithm processes the values of M and N and produces a stream of x(i) values in the form of:

x(1), x(2), x(3) ... x(N)

This stream of x(i) values is continuously sent by main module 50 to auxiliary module 60. For example, such a stream of x(i) values as the following stream:

35000, 35000, 35001, 35000, 35000, 35001 ...

means that the first and second pixel columns will represent 35000 readings each, the third pixel column will represent 35001 readings, the fourth and fifth column will also represent 35000 readings each, the sixth column will represent 35001 readings, and so on.

Upon receiving each discrete x(i) value, auxiliary module 60 acquires an identical number of consecutive readings from the stream of digital readings, received from ADC 30. In the latter example, x(1) equals 35000 and therefore auxiliary module 60 would initially acquire a batch of 35,000 consecutive digital readings.

Upon acquiring each batch of x(i) readings, auxiliary module 60 executes any of various algorithms known in the art for converting a batch of digital values into one or more representative values as detailed hereinabove. The representative value or values are then sent by computer 40 to display 70 as pixel information to be plotted on a respective pixel column in the predetermined display area. Display 70 receives from computer 40 a continuous stream of pixel information containing values to be plotted, and continuously plots these values on the screen (e.g. from left to right).

FIG. 4 is a flowchart depicting a preferred data processing algorithm according to method 200 of the present invention.

Upon a change in the value of source range M, the preferred algorithm is initiated 110. Next, the value of source range M is compared 112 to the value of target range N.

If target range N is equal to the source range M, then each pixel will represent exactly one reading. In such a case no special data processing will be required and the algorithm will end (step 140).

If target range N is greater than M, then there will be more than one pixel per reading. In such a case, the serial number of a pixel used to display a reading, denoted by the variable x[r], can obviously be determined by the following equation:

$$x[r] = \text{Integer part of quotient}[(r \times N)/M]$$

where r=1 ... M and r is a variable that denotes the serial number of a reading.

The above simple equation will achieve a periodic distribution of pixels per readings along the display area. Additionally, variation of the number of readings per pixel is minimized. This case does not require special data processing and therefore the algorithm will end (step 140).

However, if target range N is less than source range M, then at least one pixel column will represent more than one reading. In such a case, a special algorithm is required in order to determine exactly how many readings will be represented by each pixel column, and the process will proceed to step 114. In step 114, a first constant q is set to equal the quotient of source range M divided by target range N:

$$q = M/N$$

In step 116, a second constant K is set to equal the integer part of q, that is the greatest whole number which is less than or equal to q. In other words, K is set to equal the integer part of the quotient of M divided by N:

$K=\text{Integer}[q]=\text{Integer part of quotient}[M/N]$

In step 118, the serial number of the pixel that is currently being considered, denoted by a first variable i, is set as follows:

$i=1$

In step 120, the number of readings assigned to the current pixel column (i.e. pixel column number), denoted by a second variable x[i], is set as follows:

$x[i]=x[1]=K$

This means that the first available pixel will always represent K readings. In step 122, a third constant z, signifying the aggregate number of readings which have been processed so far, is set as follows:

$z=x[i]=x[1]$

Following, in step 124, the serial number of the pixel column currently being processed is set as follows:

$i=i+1=2$

In order to determine how many readings will be represented by pixel column i, which is currently the second pixel column, the algorithm proceeds to step 126. In step 126, a comparison is made between a first expression [z+K+1] and a second expression [i×q]. If the first expression is greater than the second expression, then step 128 will follow and the number of readings represented in the current pixel column will be set as follows:

$x[i]=K$

But, if the second expression is less than or equal to the first expression, then step 130 will follow, and the number of readings represented in the current pixel column will be set as follows:

$x[i]=K+1$

Following step 128 or step 130 a constant z, designating the number of readings which have been represented so far, is set 132 as follows:

$z=z+x[i]$

In step 134, the serial number of pixel column being considered is set as follows:

$i=i+1$ and therefore, at this stage:

$i=3$

In step 136 a comparison is made between the number of the current pixel column being processed i, and the total number of available pixel columns N. If the former is less than or equal to the latter, then there is at least one additional pixel column available for displaying digital readings, and therefore the algorithm will return to step 126 and continue from there. However, if i is greater than target range N, then there are no more available pixel columns, and the algorithm will end (step 140).

It is a particular feature of the preferred algorithm of the present invention, that it ensures that the given readings are distributed throughout the given pixel columns in an even (minimally varied) and periodic manner, so that the display of the digitized signal appears as proportional as possible. In determining the number of readings per pixel, the algorithm considers only the following two alternatives: (i) K, which equals the integer part of the quotient of source range M divided by target range N, and (ii) K+1. In this way, the variability of the number of readings represented by different pixel columns is minimized, and therefore the proportionality of the display of the digital data is maximized.

It is another particular feature of method 200, that it determines the number of readings per display element in a continuous manner, from the first to the last available pixel column. In this way, a display apparatus can begin to plot readings on the display area as soon as the algorithm determines the number of readings which will be represented in the first available pixel column. There is no need to wait until the algorithm completes its process in order to begin plotting readings on the display area. This feature ensures minimal delay between the processing stage and the displaying stage.

It is another particular feature of the preferred algorithm, that it ensures that all readings are represented on the given display area, and none are discarded. Hence, method 200 provides maximum representation of the information embodied in the digital readings, using a predetermined number of pixel columns.

It is yet another particular feature of the preferred algorithm, that it can be implemented in software. The algorithm can be implemented in a relatively simple, economical computer program which can be executed using conventional, easily attainable personal computing equipment. The method of the present invention does not require any dedicated hardware or firmware.

Following is a short example of results achieved by using the preferred algorithm of the present invention, i.e. the algorithm of main module 50. Let us consider that the user chooses to display 1,000,300 digital readings on a display containing 400 available pixel columns. Accordingly, source range M and target range N will be set as follows:

$M=1,000,300$ $N=400$

Upon a change in M, the preferred algorithm is initiated (step 110). In step 112, a comparison is made between source range M and target range N. Since the former is greater than the latter, the algorithm will proceed to step 114, and set a first constant q as follows:

$q=M/N=1,000,300/400=2500.75$

In step 116, a second constant K is set as follows:

$K=\text{Integer}[q]=\text{Integer}[2500.75]=2500$

In step 118, the number of the current pixel column being processed, designated as i, is set as follows:

$i=1$

In step 120, the number of readings which will be represented by the current pixel column, the first pixel column, is set as follows:

$x[i]=K$ $x[1]=2500$

In step 122, the number of readings which have been processed so far, denoted by a third constant z, is set as follows:

$z=x[i]=x[1]=2500$

In step 124, the number of the current pixel column being processed i is set as follows:

$i=i+1=1+1=2$

In step 126, the ensuing comparison is made:

$(z+K+1)>(i\times q)$ $(2500+2500+1)>(2\times 2500.75)$ $(5001)>(5001.5)$

NO

The result of the above comparison is negative, because the first expression is not greater than the second expression. Therefore, the algorithm proceeds to step 130.

In step 130, the number of readings attributed to the current pixel column, the second pixel column, is set as follows:

$x[i]=K+1$ $x[2]=2500+1$ $x[2]=2501$

Following, in step 132, the aggregate number of readings processed so far z is set as follows:

$z=z+x[i]$ $z=z+x[2]$ $z=2500+2501$ $z=5001$

In step 134, the number of the pixel to be considered next is set as follows:

$i=i+1=2+1=3$

In step 136, the following comparison is made:

$i>N$ $3>400$

NO

The comparison results in the negative, and therefore the algorithm returns to step 126. The algorithm will continue as described above in reference to FIG. 4. When i is greater than the total number of available pixel columns N, it means that there are no more available pixel columns and therefore the algorithm will end (step 140).

FIGS. 5a–d are pictures of a display of a digitized electrical signal, the signal having been processed according to method 200. The pictures show the amplitude of the signal over a time scale. In FIGS. 5a–d, the horizontal axis (x-axis) represents time, and the vertical axis (y-axis) represents the amplitude. In each case, the display area consists of the same predetermined number of pixels, thus target range N remains constant. However, in each case, a different source range (M) was chosen.

In FIG. 5a, a relatively low source range M was chosen. As a result, only a small portion of the digitized signal is shown, and only four peaks designated 201, 202, 203, and 204 are visible. These four peaks take up almost the whole width of the display area of display 70.

In FIG. 5b, a greater source range M was chosen. As a result, a greater portion of the digitized signal is now visible over the same predetermined area of display 70. The signal appears as if it were horizontally "condensed", "compressed", "shrunk", or "contracted" in relation to its display in FIG. 5a. This is because a greater number of digital samples representing the signal is shown over the same predetermined number of graphical display elements. In other words, a longer time range of the signal is now shown over the same predetermined area of display 70. As a result of this "horizontal contraction" effect, peaks 201–204 now take up only approximately half the width of the display 70 area.

In FIG. 5c source range M is further increased. As a result, peaks 201–204 appear even more "compressed" than in FIG. 5a and b. Moreover, now five additional peaks 205, 206, 207, 208 and 209, are visible on the display area of display 70.

In FIG. 5d the source range is yet further increased, and the displayed digitized signal is further compressed over the horizontal time axis, thus providing an even wider view of the digitized signal.

FIGS. 5a–5d clearly illustrate how method 200 maintains an even and periodic distribution of any given number of digital samples throughout the predetermined display area. It is further apparent that the "horizontal contraction" effect of the preferred algorithm is crucial in order to provide the user a wide picture of a stream of digital data (such as a digitized electrical signal), over a predetermined display area.

FIGS. 6a–6j provide examples of results achieved using method 200. For each of FIGS. 6a–6j a list of constant values (M, N, q and K), as well as a table and a histogram are provided. Each table lists variable values (i, x[i] and z) achieved when applying the given source range M and target range N to the preferred algorithm. Each histogram illustrates the distribution of readings among the available pixel columns. The x-axis of each histogram represents i, that is the serial number of a pixel column. The y-axis represents x[i], that is the number of digital readings represented in a pixel column, as determined by the algorithm. A striped bar in the histogram signifies a pixel column which represents K samples. A solid bar in the histogram signifies a pixel column which represents (K+1) samples.

FIGS. 6a–6j clearly illustrate that method 200 can lead to a minimally varied and periodic distribution of pixel columns representing K samples, in comparison to pixel columns representing (K+1) samples, along the given display area.

It is emphasized that the values of source ranges M and target range N listed in FIGS. 6a–j are far less than they typically would be in practice of method 200. Whereas in these examples the values of source range M vary between 190 and 200 and the value of target range N equals 10, in reality, source ranges are typically on the order of millions or even billions and target ranges are typically on the order of hundreds or a few thousands. However, the magnitude or scale of the different constants and variables does not affect the functionality of method 200.

Figure 6A:
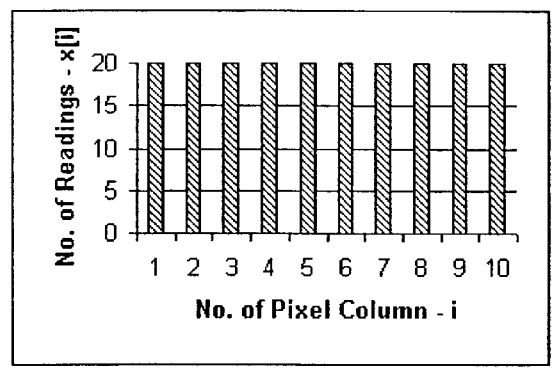
FIGS. 6a–6j are tables and charts illustrating different results achieved using a method according to the present invention.

Referring now specifically to FIG. 6a, the table lists the results achieved by the preferred algorithm of the present invention, when given a source range M of 200 readings, and a target range N of 10 pixels. Examining the column of x[i] in the table, it is apparent that all values equal 20. This means that the algorithm has determined that all pixel columns will represent K samples each. This is obviously the optimal solution under the given circumstances. Since q is a whole number, meaning that M divided by N results in a whole number, it is best to assign an equal number of readings (K readings) to each pixel column. Such a solution minimizes variability in the attribution of readings to pixels, and maximizes the proportionality of the distribution of readings per pixel column throughout the display area, and thus ensures a proportional display of the digital data. The histogram in FIG. 6a further illustrates this characteristic of the preferred algorithm.

Figure 6B:
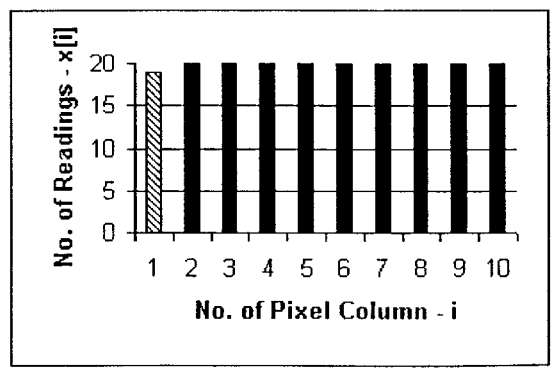

Referring now to FIG. 6b, the table lists the results achieved by the preferred algorithm when source range M equals 199 and target range N equals 10. It is apparent that apart from one pixel column, that is the first pixel column representing 19 readings, all other pixel columns represent an equal number of readings each (20 readings each). The histogram further illustrates this characteristic.

Figure 6C:
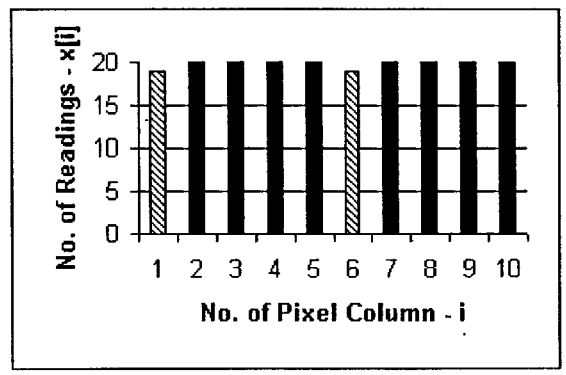
Figure 6D:
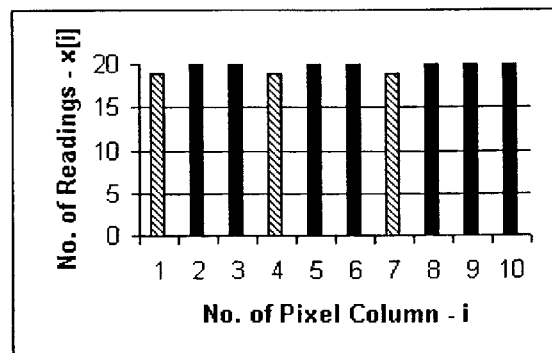
Figure 6E:
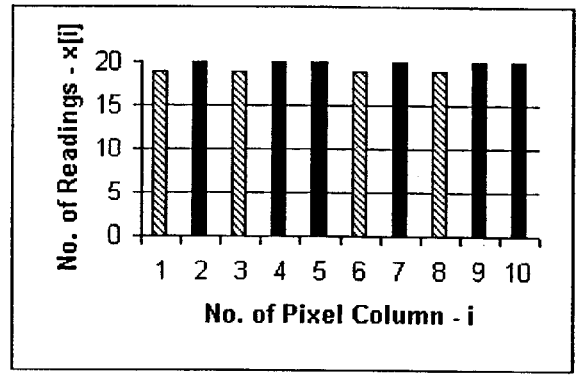

Referring now to FIG. 6c, the table lists the results achieved by the preferred algorithm when M equals 198 and N equals 10. It is apparent that 2 out of 10 available pixel columns will represent 19 readings, whereas 8 pixel columns will represent 20 readings. The histogram illustrates how the algorithm distributes the readings with a fixed periodicity: the first pixel column represents 19 samples, the following four pixel columns (the second, third, fourth and fifth columns) represent 20 samples each, the sixth pixel column represents 19 samples, and the remaining four pixel columns represent 20 samples each.

Similarly, the tables and charts in FIGS. 6d–6j illustrate how the preferred algorithm always leads to an optimal distribution with a fixed periodicity of readings per pixel column along the given display area. This characteristic of the preferred algorithm is critical for eliminating disproportions in the display of the digital data.

Figure 6F:
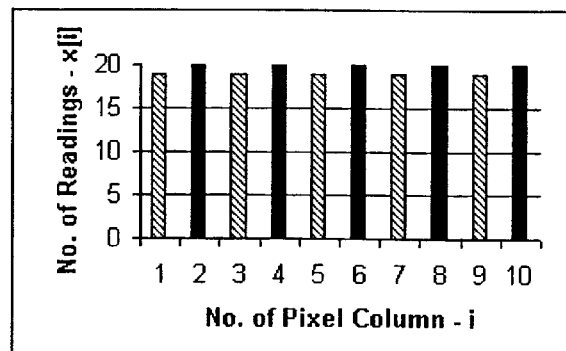
Figure 6G:
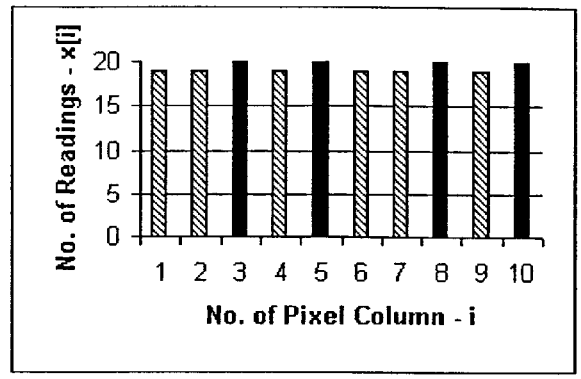
Figure 6H:
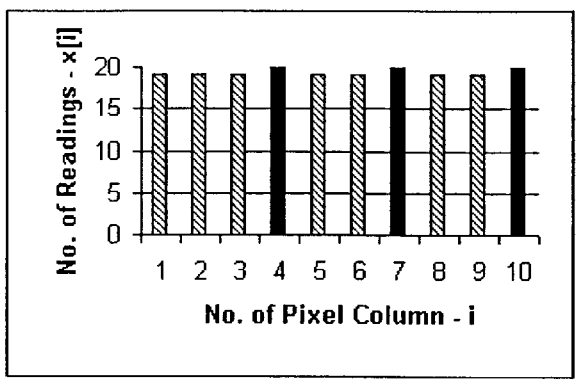
Figure 6I:
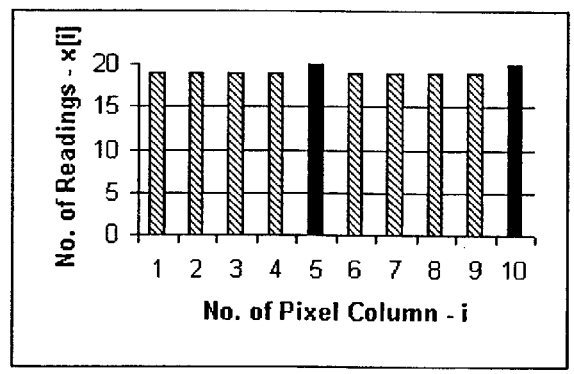
Figure 6J:
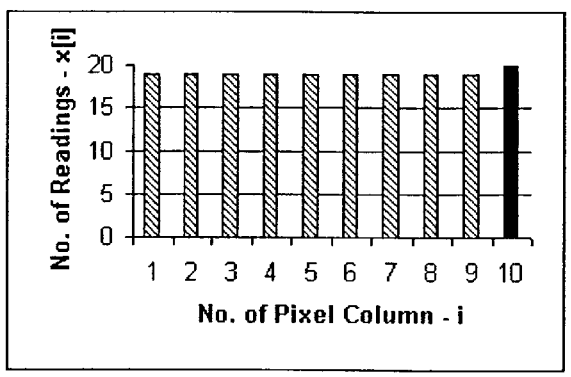

It is a specific feature of the preferred algorithm of the present invention, that as the source range (M) increases, the variability of the number of digital readings attributed to different pixel columns decreases. As mentioned hereinabove, in determining the number of readings per pixel, the preferred algorithm always considers only two alternatives, namely, K and (K+1). For example, FIG. 6f shows that given a target range of 10 pixels and a source range of 195 readings, the algorithm will assign to each pixel column either 19 readings (K readings) or 20 readings (K+1 readings). The difference between these two alternatives is a difference of 1 reading. The variability of these two alternatives is therefore 1 reading per 20 readings, that is a variability of 5%. On the other hand, if the target range remains 10 pixels while the source range is increased, for example, to 190,005 readings, then the algorithm will consider either 19,000 readings (K readings) or 19,001 readings (K+1 readings) alternatively. In such a situation, the variability will be only 1 reading per 19,001 readings, that is 0.0053%. Such variability is so low, that it would be undetectable to a human eye. In other words, it would seem to a human user that each pixel column on the display represents exactly the same number of readings, although in fact, some pixel columns represent one reading more than other pixel columns. An even lower variability would be reached if the source range included millions or billions of readings.

It is therefore a major advantage of the preferred algorithm of the present invention, that it leads to a minimal, practically negligible variability in the distribution of readings per pixel columns throughout the given display area. Consequently, it is also a major advantage of the preferred algorithm, that it enables compression of the displayed data with practically no visible distortion thereof.

Thus, it is evident that the present invention provides an accurate, dynamic and economical method for representing a stream containing a predetermined number of digital values, using a lower, predetermined number of graphical display elements.

While a preferred data processing algorithm has been disclosed hereinabove, it is to be understood that this algorithm is given as an example only and is not intended to be limiting. Those skilled in the art may make various modifications and additions to the algorithm used to illustrate the method of the present invention and those modifications and additions would remain within the scope of the present invention.

As expressly stated hereinabove in the beginning of the detailed description of the invention, FIGS. 1–3 and the description thereof illustrate only an example of a suitable computing environment in which the method of the present invention may be implemented. It is emphasized that method 200 is not limited to plotting a digitized signal as a function of time. Other uses, including but not limited to displaying a frequency spectrum are included in the scope of the present invention. Moreover, the method is not confined to displaying digital samples, and could be used for displaying any array of digital values, regardless of their origin.

The present invention is also not confined to an environment in which digital data is eventually represented in video form (i.e. displayed on a screen). The disclosed method can obviously be implemented in a system which represents the processed digital data in tangible form (e.g. a printed output), in audio form (e.g. a facsimile or modem output or an audible signal) or in any other form of output.

Furthermore, the present invention can be adapted to support not only a square or rectangular representation (i.e. a display area which consists of uniform columns and uniform rows of graphical display elements), but also displays in other shapes, such as round, oval, segment, etc.

It should further be noted that the method of the present invention can be embodied not only in software, but also in hardware and or firmware. For example, the preferred algorithm can be embodied in a Programmable Logic Device (PLD) microchip such as the one available from Altera Corporation of San Jose, Calif.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method of displaying a stream of data containing a first number of digital values on a display area of a predetermined size containing a second number of display elements, said second number being less than said first number, the method comprising the steps of:

(a) attributing to each display element a portion of the first number of digital values, the total number of digital values in all of said portions being equal to said first number, and the number of digital values in each portion will vary periodically;

(b) determining at least one representative digital value for each of said portions, and (c) displaying on each discrete display element in said display said at least one representative digital value;

wherein the number of digital values in each of said portions is selected from a group consisting of:
  (i) the quotient of dividing said first number by said second number;
  (ii) the lowest whole number greater than said quotient; and
  (iii) the greatest whole number less than said quotient.

2. The method of claim 1, wherein said number of digital values in each portion varies with a fixed periodicity.

3. The method of claim 1, wherein said number of digital values in each portion is characterized by minimum variability.

4. The method of claim 1, wherein said stream of digital values is a stream of digital samples.

5. The method of claim 4, wherein said stream of digital samples represents a digitized electrical signal.

6. The method of claim 5, wherein said digitized electrical signal represents an ultrasonic signal.

7. The method of claim 1, wherein said step of determining includes using an algorithm.

8. The method of claim 1, wherein the display elements are selected from the group consisting of pixel rows and pixel columns.

9. The method of claim 1, wherein said step of displaying includes displaying a frequency spectrum.

10. A method of displaying a stream of data containing a first number of digital values on a display area of a predetermined size containing a second number of display elements, said second number being less than said first number, the method comprising the steps of:

(a) attributing to each display element a portion of the first number of digital values, the total number of digital values in all of said portions being equal to said first number, and the number of digital values in each portion will vary periodically;

(b) determining at least one representative digital value for each of said portions, and (c) displaying on each discrete display element in said display said at least one representative digital value;

wherein said step of determining includes using an algorithm selected from the group consisting of determining a maximum value, determining a minimum value, computing a mean, computing a mode, computing a median, computing a weighted average, a randomly selected value and selecting a digital value received at a time approximating a mid-point of a time during which said portion is received.

11. A method of determining for each graphical display element in an apparatus with a lesser number of graphical display elements a corresponding number of digital values to represent, the digital values being selected from a stream containing a greater number of digital values, the method comprising the steps of:

(a) dividing the greater number by the lesser number to ascertain a quotient; and (b) determining for each graphical display element a corresponding number of digital values to represent, based on said quotient;

wherein the apparatus uses a known method of representing a plurality of digital values using a single graphical display element.

12. The method of claim 11, wherein the apparatus is selected from the group consisting of a Digital Storage Oscilloscope (DSO) and an ultrasonic flaw detection device.

13. The method of claim 11, wherein said digital values are digital samples.

14. The method of claim 13, wherein said digital samples represent a digitized electrical signal.

15. The method of claim 14, wherein said digitized electrical signal represents an ultrasonic signal.

16. The method of claim 11, wherein said apparatus displays said stream containing a greater number of digital values on said graphical display elements, as a frequency spectrum.

17. The method of claim 11, wherein said determining of a corresponding number based on said quotient, further maintains a periodic distribution of said determined corresponding numbers.

18. The method of claim 11, wherein said determining of a corresponding number based on said quotient, further maintains minimal variability between said corresponding numbers.

19. The method of claim 11, wherein said determining of a corresponding number based on said result, comprises selecting a number from a group consisting of the quotient of dividing said greater number by said lesser number, the greatest whole number less than said quotient and the lowest whole number greater than said quotient.

* * * * *